(12) United States Patent
Harvey

(10) Patent No.: US 9,488,217 B2
(45) Date of Patent: Nov. 8, 2016

(54) SOFT RUBBER ROLL COVER WITH WIDE GROOVES

(71) Applicant: Stowe Woodward Licensco, LLC, Raleigh, NC (US)

(72) Inventor: Glen A. Harvey, Baton Rouge, LA (US)

(73) Assignee: Stowe Woodward Licensco, LLC, Raleigh, NC (US)

( * ) Notice: Subject to any disclaimer, the term of this patent is extended or adjusted under 35 U.S.C. 154(b) by 232 days.

(21) Appl. No.: 14/490,075

(22) Filed: Sep. 18, 2014

(65) Prior Publication Data

US 2015/0087490 A1    Mar. 26, 2015

Related U.S. Application Data

(60) Provisional application No. 61/880,364, filed on Sep. 20, 2013.

(51) Int. Cl.
| F16C 13/00 | (2006.01) |
| D21F 3/08 | (2006.01) |
| D21F 3/10 | (2006.01) |

(52) U.S. Cl.
CPC ............. *F16C 13/00* (2013.01); *D21F 3/086* (2013.01); *D21F 3/105* (2013.01)

(58) Field of Classification Search
CPC .......... D21F 5/182; D21F 5/184; D21F 5/18; D21F 5/181; D21F 3/08; D21F 3/083; D21F 3/086
USPC ...................................... 492/30–37
See application file for complete search history.

(56) References Cited

U.S. PATENT DOCUMENTS

| 3,198,694 | A |   | 8/1965  | Justus |              |
|-----------|---|---|---------|--------|--------------|
| 4,880,501 | A | * | 11/1989 | Schiel | D21F 3/0227  |
|           |   |   |         |        | 100/121      |
| 5,543,015 | A | * | 8/1996  | Jermo  | D21F 3/0227  |
|           |   |   |         |        | 162/358.4    |
| 5,914,007 | A | * | 6/1999  | Henssler | D21F 3/02  |
|           |   |   |         |          | 100/153    |
| 6,416,630 | B1 | * | 7/2002 | Matuschczyk | D21F 3/0227 |
|           |    |   |        |             | 162/358.4   |
| 6,447,648 | B1 | * | 9/2002 | Slagowski | D21F 3/0227  |
|           |    |   |        |           | 162/358.4    |
| 6,505,658 | B2 | * | 1/2003 | Koba   | B27D 1/005   |
|           |    |   |        |        | 100/121      |
| 7,540,942 | B2 | * | 6/2009 | Hikita | D21F 3/0218  |
|           |    |   |        |        | 162/358.4    |
| 2003/0121626 | A1 |   | 7/2003 | Hultzcrantz |         |
| 2007/0111871 | A1 |   | 5/2007 | Butterfield et al. |  |
| 2012/0193058 | A1 |   | 8/2012 | Wokurek et al. |      |

FOREIGN PATENT DOCUMENTS

| GB | 1327059       | 8/1973 |
| WO | WO 2010/097127 | 9/2010 |

OTHER PUBLICATIONS

International Search Report and Written Opinion for corresponding PCT Application No. PCT/US2014/056217, 16 pages, date of mailing Dec. 11, 2014.

* cited by examiner

*Primary Examiner* — Jason L Vaughan
(74) *Attorney, Agent, or Firm* — Myers Bigel & Sibley P.A.

(57) ABSTRACT

An industrial roll includes: a substantially cylindrical metallic core; a base layer that is adhered to and circumferentially overlies the core; and a top stock layer that circumferentially overlies the base layer. The top stock layer includes circumferential grooves, wherein the grooves have a width/height ratio of at least 0.7.

16 Claims, 2 Drawing Sheets

SOFT RUBBER ROLL COVER WITH WIDE GROOVES

RELATED APPLICATION

The present application claims the benefit of and priority from U.S. Provisional Patent Application No. 61/880,364, filed Sep. 20, 2013, the disclosure of which is hereby incorporated herein in its entirety.

FIELD OF THE INVENTION

The present invention relates generally to industrial rolls, and more particularly to covers for industrial rolls.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemical agents. As an example, in a typical paper mill, rolls are used not only for transporting a fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a metallic core. By varying the polymer or elastomer employed in the cover, the cover designer can provide the roll with different performance characteristics as the papermaking application demands. Also, repair, regrinding or replacement of a cover over a metallic roll can be considerably less expensive than the replacement of an entire metallic roll.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

In some instances, circumferential grooves are included in the roll cover to encourage drainage from the paper sheet. Improved drainage typically results in energy savings for the paper mill. Grooves are typically formed in harder rolls (10 P&J or lower) and have a width of between about 0.020" and 0.040" and a depth of between about 0.090" and 0.125." Generally speaking, deeper grooves are preferred due to the increased drainage they can encourage. The configuration of a typical set of grooves for harder covers is shown in FIG. 1, wherein a section of a cover 10' with grooves 30' is illustrated. Covers formed of softer materials (e.g., a rubber having a hardness of 35 on the Pusey and James (P&J) scale) have not included grooves, because the walls of the grooves tended to deflect toward each other under load, thereby pinching off the grooves and preventing water from entering the grooves as they passed through the nip. In particular, the high Poisson's ratio of rubber caused grooves formed in softer rubber materials to deform and collapse.

Tissue manufacture typically employs soft covers in order to conform the paper sheet to a mating structure (sometimes called a "Yankee can") for improved drying efficiency. However, grooves of the type described above have not been used in soft covers employed in tissue production for the reason stated above: namely, that the walls of the grooves deform and close the groove, thereby reducing or eliminating the benefits of the grooves.

SUMMARY OF THE INVENTION

As a first aspect, embodiments of the invention are directed to an industrial roll. The industrial roll comprises: a substantially cylindrical metallic core; a base layer that is adhered to and circumferentially overlies the core; and a top stock layer that circumferentially overlies the base layer. The top stock layer includes circumferential grooves, wherein the grooves have a width/height ratio of at least 0.7.

As a second aspect, embodiments of the invention are directed to an industrial roll, comprising: a substantially cylindrical metallic core; a rubber base layer that is adhered to and circumferentially overlies the core; and a rubber top stock layer that circumferentially overlies the base layer, the material comprising the topstock layer having a Pusey and Jones (P&J) hardness of 35 or higher, wherein the top stock layer includes circumferential grooves.

As a third aspect, embodiments of the invention are directed to an industrial roll, comprising: a substantially cylindrical metallic core; a base layer that is adhered to and circumferentially overlies the core; and a top stock layer that circumferentially overlies the base layer, the material comprising the top stock layer having a Poisson's ratio of at least 0.35, wherein the top stock layer includes circumferential grooves.

DETAILED DESCRIPTION OF EMBODIMENTS OF THE INVENTION

Figure 1:
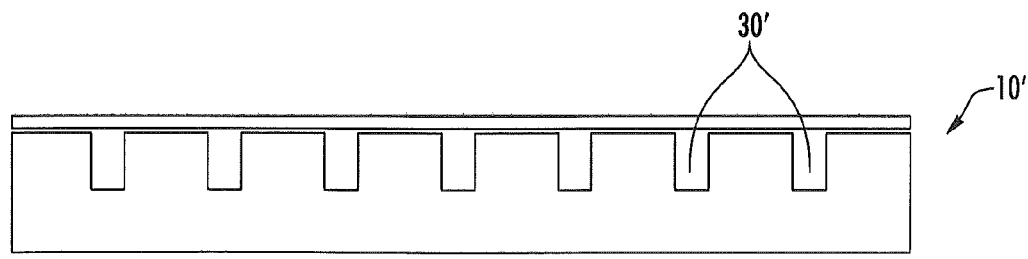
FIG. 1 is an axial section view of grooves in a prior art roll cover.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity. Well-known functions or constructions may not be described in detail for brevity and/or clarity.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
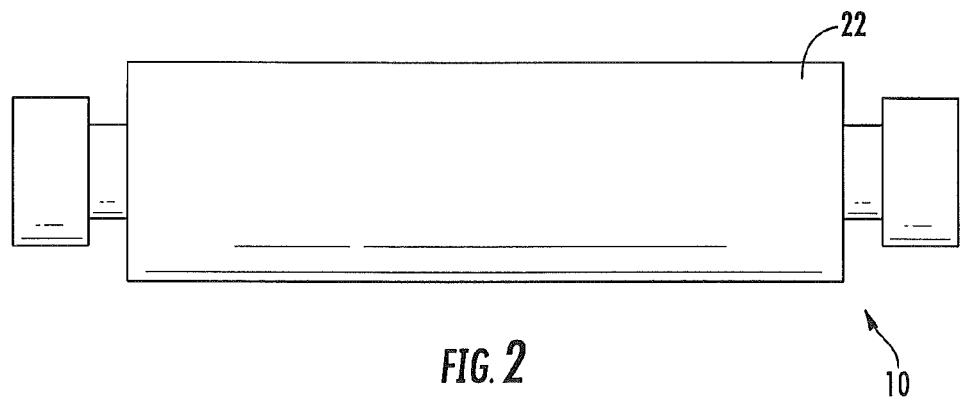
FIG. 2 is a front view of an industrial roll according to embodiments of the invention.
Figure 3:
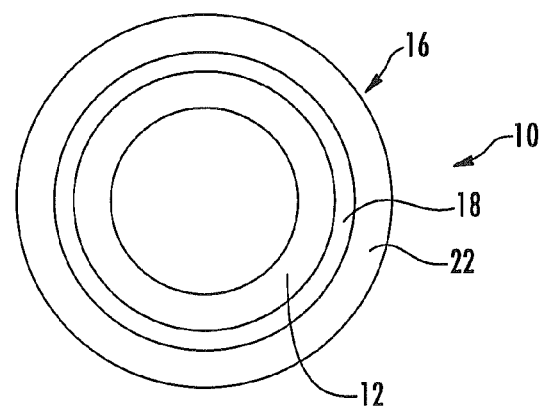
FIG. 3 is a section view of the roll of FIG. 2.

Referring now to the figures, a roll, designated broadly at 10, is illustrated in FIGS. 2 and 3. The roll 10 includes in overlying relationship a core 12 (typically metallic) and a cover 16 that includes a base layer 18 and a top stock layer 22, both of which are typically formed of rubber. These layers are described in some detail in U.S. Patent Publication No. 2007/0111871, the disclosure of which is hereby incorporated herein in its entirety.

Figure 4:
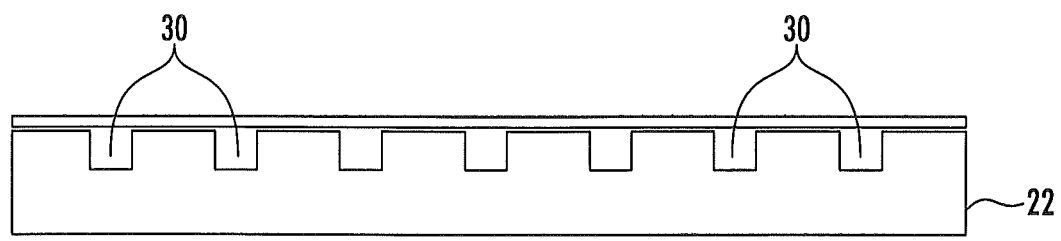
FIG. 4 is a greatly enlarged axial section view of grooves in the roll of FIG. 2.

Referring now to FIG. 4, a number of circumferential grooves 30 present in the top stock layer 22 are shown. Notably, the grooves 30 are shallower and wider than those employed in prior roll covers. More specifically, the grooves 30 have a width/height ratio of 0.70, 0.80, 0.90 or greater (for example, grooves 30 may be 0.044" wide and 0.055" deep, a W/H ratio of 0.8). The dimensions of these wider, shallower grooves 30 prevent the walls of the grooves 30 from deforming to an extent that they close off the grooves 30 when the grooves 30 are loaded with a mating structure (like a Yankee can) during operation. Typically, the grooves 30 are generally uniformly spaced across most or all of the length of the roll cover 16 (for example, the grooves 30 may be included in a frequency of 6 grooves/inch).

The grooves 30 may be employed with any cover material, but in some embodiments are included in rubber covers, and in particular in rubber covers with a hardness of 35 P&J or higher (i.e., softer than 35 P&J). In certain embodiments, the material of the top stock layer 22 has a Poisson's ratio of at least 0.35, and in some embodiments at least 0.45. Rubber materials that have good abrasion resistance and temperature stability are suitable for certain embodiments. In some embodiments, the rubber material of the top stock layer 22 may include carbon black, silica, clay or the like as fillers.

The presence of the grooves 30 in the cover 16 may reduce the energy required for drying tissue paper during manufacturing.

Figure 5:
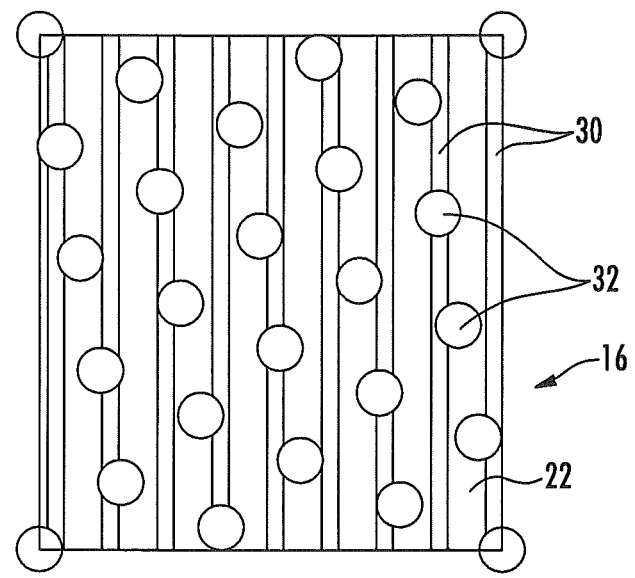
FIG. 5 is a top view of a typical groove and drilled hole pattern for a roll according to embodiments of the invention.

In some embodiments, the cover 16 may also include drilled holes 32 that extend from the exterior surface of the topstock 22 to the inside of the core 12 (see FIG. 5, which illustrates an exemplary pattern of drilled holes 32 and grooves 30). In such rolls, known as suction rolls, a suction device exerts negative pressure on the drilled holes, which further encourages drainage of water from the cover 16.

In some embodiments, the cover 16 may also include blind drilled holes that are drilled to a depth less than the thickness of the cover 16. In such rolls, the combination of the blind drilled holes and the grooves 30 can further encourage drainage of water from the cover 16.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll, comprising:
   a substantially cylindrical metallic core;
   a base layer that is adhered to and circumferentially overlies the core; and
   top stock layer that circumferentially overlies the base layer;
   wherein the top stock layer comprises a material having a Pusey and Jones (P&J) hardness of 35 or higher;
   wherein the to stock layer further comprises blind drilled holes;
   wherein the top stock layer includes circumferential grooves, and wherein the grooves have a width/height ratio of at least 0.7.

2. The industrial roll defined in claim 1, wherein the top stock layer comprises rubber.

3. The industrial roll defined in claim 1, wherein the material comprising the top stock layer has a Poisson's ratio of at least 0.35.

4. The industrial roll defined in claim 1, wherein the top stock layer further comprises through holes.

5. The industrial roll defined in claim 1 in combination with a Yankee can of a papermaking machine.

6. The industrial roll defined in claim 1 in combination with a Yankee can of a papermaking machine.

7. An industrial roll, comprising:
   a substantially cylindrical metallic core;
   a rubber base layer that is adhered to and circumferentially overlies the core; and
   a rubber top stock layer that circumferentially overlies the base layer, the material comprising the topstock layer having a Pusey and Jones (P&J) hardness of 35 or higher;
   wherein the to stock layer further comprises through holes;

wherein the top stock layer includes circumferential grooves, and wherein the grooves have a width/height ratio of at least 0.7.

8. The industrial roll defined in claim 7, wherein the material comprising the top stock layer has a Poisson's ratio of at least 0.35.

9. The industrial roll defined in claim 7, wherein the top stock layer further comprises blind drilled holes.

10. The industrial roll defined in claim 7 in combination with a Yankee can of a papermaking machine.

11. An industrial roll, comprising:
 a substantially cylindrical metallic core;
 a base layer that is adhered to and circumferentially overlies the core; and
 a top stock layer that circumferentially overlies the base layer, the material comprising the top stock layer having a Poisson's ratio of at least 0.35;
 wherein the top stock layer includes circumferential grooves, and wherein the grooves have a width/height ratio of at least 0.7.

12. The industrial roll defined in claim 11, wherein the top stock layer comprises rubber.

13. The industrial roll defined in claim 11, wherein the top stock layer comprises a material having a Pusey and Jones (P&J) hardness of 35 or higher.

14. The industrial roll defined in claim 11, wherein the top stock layer further comprises blind drilled holes.

15. The industrial roll defined in claim 11, wherein the top stock layer further comprises through holes.

16. An industrial roll, comprising:
 a substantially cylindrical metallic core;
 a base layer that is adhered to and circumferentially overlies the core; and
 a top stock layer that circumferentially overlies the base layer, the material comprising the top stock layer having a Pusey and Jones (P&J) hardness of 35 or higher;
 wherein the to stock layer includes circumferential grooves, and wherein the grooves have a width/height ratio of at least 0.7.

* * * * *

UNITED STATES PATENT AND TRADEMARK OFFICE
CERTIFICATE OF CORRECTION

PATENT NO. : 9,488,217 B2
APPLICATION NO. : 14/490075
DATED : November 8, 2016
INVENTOR(S) : Harvey Page 1 of 1

It is certified that error appears in the above-identified patent and that said Letters Patent is hereby corrected as shown below:

In the Claims

Column 4, Claim 1, Line 43: Please correct "wherein the to stock layer" to read -- wherein the top stock layer --

Column 4, Claim 7, Line 66: Please correct "wherein the to stock layer" to read -- wherein the top stock layer --

Column 6, Claim 16, Line 18: Please correct "wherein the to stock layer" to read -- wherein the top stock layer --

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*